UNITED STATES PATENT OFFICE 2,139,922

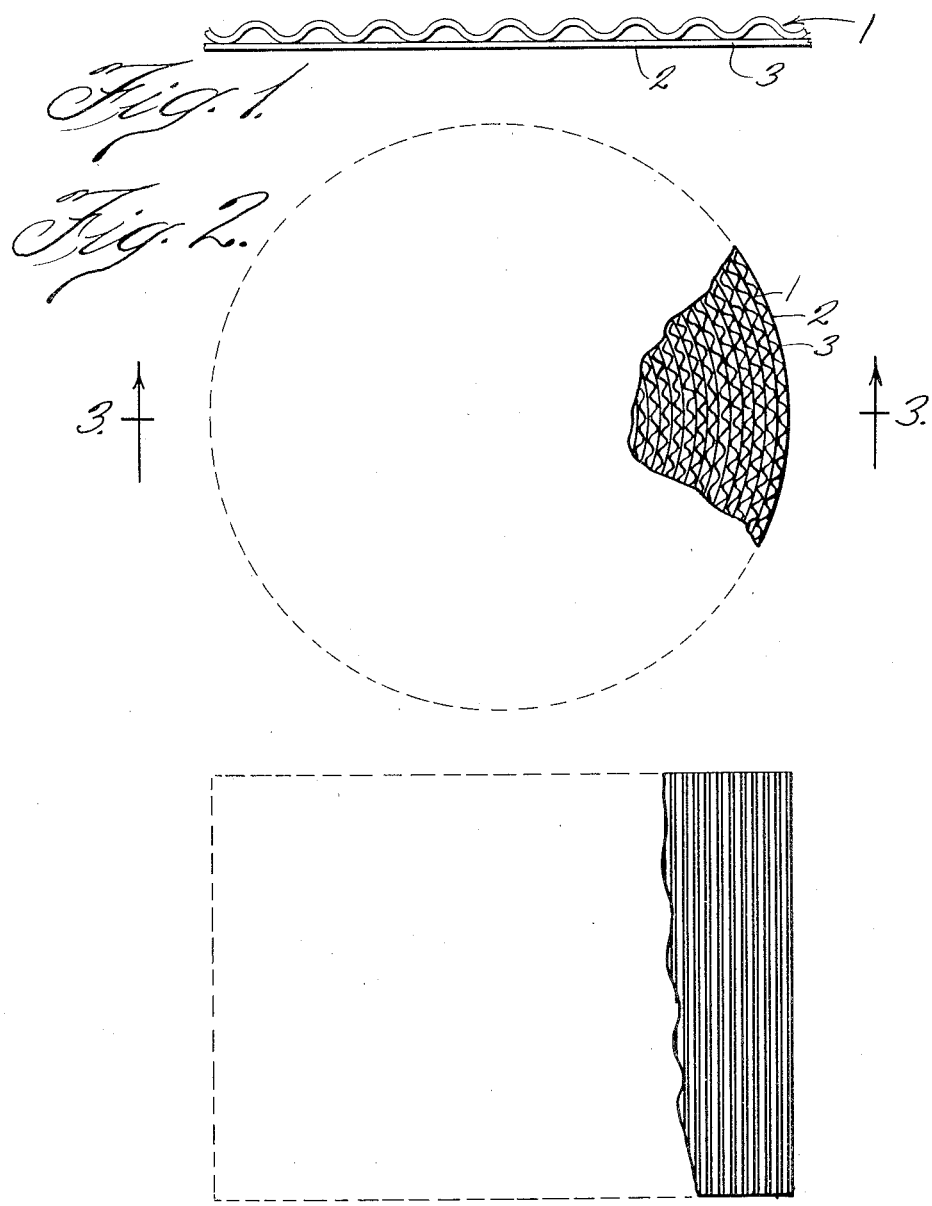

CORRUGATED RUBBER BUNDLE

Floyd E. Williams and Henry F. Irving, Gary, Ind., assignors to Marbon Corporation, Chicago, Ill., a corporation of Delaware Application September 12, 1936, Serial No. 100,534

3 Claims. (Cl. 154—55)

This invention relates to corrugated sheet material and to artificial masses formed therefrom. More particularly it relates to compact, porous, solid masses composed of a plurality of plies of corrugated rubber hydrochloride.

It is an object of this invention to provide composite corrugated sheets of rubber capable of being rolled into a bundle which still retains the corrugations whereby liquid or gaseous reagent can circulate through the corrugations or spaces and thereby quickly and uniformly react with all portions of the rubber.

A further object is to provide corrugated sheets of rubber derivatives in roll form in which the corrugations form tubes running parallel to the axis of the roll.

Another object is to provide a means for transforming rubber to rubber hydrochloride in the form of a compact readily usable bundle.

Other objects will become apparent on referring to the specification and claims.

In accordance with our invention rubber in thin sheet form is run through corrugating rolls and while still in the crimped state is attached to a flat sheet of rubber which forms a backing for the corrugated sheet and retains the corrugations in shape. This two ply sheet is then rolled into a bundle and reacted with hydrogen chloride.

The invention may be understood by referring to the accompanying drawing in which:

Fig. 1 represents a vertical sectional view of my corrugated and composite rubber or rubber derivative sheet;

Fig. 2 represents a plan view of the sheet of Fig. 1 rolled into a bundle or blade.

Fig. 3 is a sectional view taken along line 3—3.

In the drawing 1 represents a corrugated sheet of rubber or rubber derivative; 2 is a thin sheet of rubber or rubber derivative; 3 is a point of contact between the two sheets.

The following example will illustrate our invention as applied to the making of rubber hydrochloride from rubber.

Example

Pale crepe rubber is milled and calendered into sheets of .015" thickness. One such sheet is passed through a hot corrugating roll which crimps the rubber. Another sheet is passed through smooth cold rolls in such a manner that it comes in contact with the hot crimped rubber as it emerges from the corrugating rolls. Because of the thermoplastic and tacky nature of rubber a firm seal is made at the points of contact of the two sheets. The resulting product is a composite and corrugated sheet as shown in the drawing. The composite sheet is loosely wound into a bundle, the corrugations forming tubular spaces throughout the bundle parallel to the axis of the bundle giving somewhat the effect of a honeycomb. The bundle is then immersed in liquefied hydrogen chloride at −85° C. which quickly penetrates into the spaces and into the rubber throughout the bundle. The bundle of rubber is completely converted into a compact, porous mass of amorphous rubber hydrochloride in less than five minutes, the rubber hydrochloride mass being corrugated similar to the rubber. The mass is then removed from the liquefied hydrogen chloride, drained, the excess hydrogen chloride removed by evacuation, and the mass washed. The mass is in such compact form that it may be readily shredded into a finely divided state suitable for dissolving or molding.

It is to be understood that various methods may be used in producing our corrugated rubber sheets. It is not necessary that hot and cold rolls be used. For example, thin sheet rubber stretched to 1½ times normal is taken directly from a rubber mill and fed between two rolls rotating in opposite directions, one roll being smooth and the other toothed. At the same time thin sheet unstretched rubber is fed between the same rolls. A corrugated composite sheet is obtained which may be wound into a compact honeycomb bundle which may then be reacted with hydrogen chloride to form the compact porous or honeycomb mass of our invention.

The rubber sheets may be of various thickness but for reactions with hydrogen chloride the preferred thickness is approximately .015" so that the hydrogen chloride does not have to penetrate any place more than a thickness of .03". With greater thickness than .03" it is difficult to obtain a uniform completely reacted bundle. Furthermore, the bundles may be of any size but should preferably be kept small so that the tubular structure will not collapse.

The bundles are preferably made in roll form. However, it is apparent that a plurality of composite sheets may be laid on each other and secured together so as to form a flat bundle, the corrugations forming a honeycomb of tubes with axes running parallel to the surface plane of the sheets. Hydrogen chloride or other reagent is circulated through the spaces and reacts with the rubber forming a rubber hydrochloride bundle of the same general form as the rubber bundle.

Our invention is particularly suitable for reactions with liquefied hydrogen chloride. Corrugated rubber bundles, however, may also be used for reacting rubber with gaseous hydrogen chloride as well as liquefied hydrogen chloride, and also for reacting rubber with other reagents than hydrogen chloride such as viz. sulfur dioxide, chlorine, etc.

We claim:

1. An intermediate product suitable for washing, shredding and other treatment preparatory to conversion into finished articles of manufacture, comprising a plurality of plies of corrugated rubber hydrochloride, the plies being in spaced relationship so as to form a multiplicity of walled passageways.

2. An intermediate product suitable for washing, shredding and other treatment preparatory to conversion into finished articles of manufacture, comprising a compact, porous, solid mass essentially composed of a plurality of composite sheets of rubber hydrochloride, each composite sheet including a corrugated sheet attached at spaced intervals to a flat sheet, the composite sheets being placed together so that a flat sheet is interposed between a corrugated sheet to form multiplicity of walled passageways.

3. An intermediate product suitable for washing, shredding and other treatment preparatory to conversion into finished articles of manufacture, comprising a convoluted composite sheet, said composite sheet comprising a corrugated sheet of rubber hydrochloride attached at spaced intervals to a flat sheet of rubber hydrochloride, the whole forming a mass of tubes with axes parallel to the axes of the convolute.

FLOYD E. WILLIAMS.
HENRY F. IRVING.